United States Patent
Bennett et al.

[11] 4,027,527
[45] June 7, 1977

[54] SYSTEM FOR DETERMINING TUBE ECCENTRICITY

[75] Inventors: Robert F. Bennett, Leechburg; Nicholaas L. Brouwer, Apollo; David M. Stricker, Lower Burrell, all of Pa.

[73] Assignee: Aluminum Company of America, Alcoa Center, Pa.

[22] Filed: Apr. 1, 1975

[21] Appl. No.: 564,056

[52] U.S. Cl. .............................. 73/67.8 S
[51] Int. Cl.² ......................... G01B 17/02
[58] Field of Search .......... 73/67.5 R, 67.8 S, 67.9, 73/67.7

[56] References Cited
UNITED STATES PATENTS

| | | | |
|---|---|---|---|
| 3,732,726 | 5/1973 | Ferber | 73/67.5 R |
| 3,827,287 | 8/1974 | Boggs et al. | 73/67.8 S |
| 3,828,609 | 8/1974 | Furon et al. | 73/67.8 S |
| 3,850,026 | 11/1974 | Lund et al. | 73/67.5 R |

*Primary Examiner*—Charles A. Ruehl
*Attorney, Agent, or Firm*—Teare, Teare & Sammon

[57] ABSTRACT

A system for determining the eccentric characteristics of a tube wall comprising a positioning assembly supported by the tube which is moving in its lengthwise direction, and a plurality of thickness sensors supported by the positioning assembly having sensing axes disposed in predetermined angular relation with respect to one another for continuously measuring the wall thickness of the tube at predetermined angular locations about its periphery as it moves in its lengthwise direction. A signal processing means is provided for continuously computing the eccentricity characteristics of the tube based entirely upon the comparative values of the thickness readings of the sensors.

14 Claims, 7 Drawing Figures

SYSTEM FOR DETERMINING TUBE ECCENTRICITY

BACKGROUND OF THE INVENTION

The present invention is related to a system for determining the eccentric characteristics of a tube, and more particularly, to a system for measurement of the wall thickness of the tube by ultrasonic devices for accurately determining the physical characteristics of the tube as related to eccentricity.

When tubes are extruded or drawn, the wall thickness varies, and sometimes these variations propogate throughout the extruding or drawing process so as to result in excessive eccentricity, and thus, in a tubing product of an unacceptable quality. Therefore, it has been found desirable to determine when such eccentricity exceeds certain limits to enable correction of the process or to terminate any further production of a defective tube, before further manufacturing costs are incurred. Moreover, it is necessary to be absolutely certain that measurements used in determining the eccentricity are accurate and reliable such that unnecessary waste does not occur.

Various types of devices have been previously employed to locate defects in or measure the eccentricity of a tube, but for one reason or another such devices have not been entirely satisfactory. For example, certain devices have not been capable of on-line operation, that is, are not capable of eccentricity determination as the tube is extruded, drawn and/or otherwise produced. In other devices used in on-line operations, the structural arrangement and/or manner of operation impose limitations on the production of the tubing.

Therefore, it has become extremely desirable to provide an on-line system for determining eccentricity which can very accurately and reliably determine the maximum deviation in the wall thickness of a tube at any point around its circumference as the tube is extruded, and thus, be used effectively to reduce manufacturing costs and maintain high quality standards, without requiring undesirable changes in the manufacturing process in order to achieve this goal.

SUMMARY OF THE INVENTION

The present invention contemplates providing an improved system for determining the eccentric characteristics of a tubing product, and more particularly, determining the eccentricity characteristics of an extruded tubing product during the extrusion process, for example. The system comprises a sensor positioning assembly which supports a plurality of thickness sensors in sensing relation with respect to a tube as it leaves an extruder. The sensor positioning assembly includes at least two thickness sensors mounted in substantially equally spaced relation from one another for continuously sensing the thickness of the tube wall as the tube moves in its lengthwise direction. Each sensor is arranged to sense along a path defining an axis which extends radially of the tube when the sensor is in the sensing position. The sensing axes of all the sensors intersect one another at substantially the center of the tube, and are arranged for producing output signals which are related to the thickness of the tube wall at the locations sensed. A signal processing assembly is provided which receives the thickness related signals from the sensors, accurately determines wall thickness and translates these thickness signals into X-coordinate and y-coordinate vector components of the eccentricity of the tube. The signal processing assembly is further arranged for summing the vector components to determine the eccentricity value and its angular location around the tube circumference.

In the form shown, the sensors are of the ultrasonic type being mounted on movable sensing heads which are arranged for movement toward and away from one another to enable the sensors to be moved between their sensing and non-sensing positions with respect to the tube. The sensing heads include a tube guide means in the form of a roller assembly having rollers which engage the tube and support it in predetermined spaced relation from the sensors so as to enable the tube to be moved in sonically coupled relation at high speed past the sensors without damage to the tube or the sensors. A means is provided to calculate the magnitude of the eccentricity and to provide visual and/or audible indications of such to an operator so that the extrusion process can be terminated or corrected, as required.

As can be seen from the foregoing, the present invention provides a reliable and accurate system which determines the eccentricity characteristics of a tube, and which can operate at extrusion speeds with little risk of damage to the tubinhg product or sensors. Further, the system concept is relatively simple in operation, being capable of determining the eccentricity characteristics of the tube product entirely on the basis of the thickness values sensed without any further data with regard to the physical characteristics of the tube other than the velocity of propogation of ultrasonic signals through the tube material.

DESCRIPTION OF THE PREFERRED EMBODIMENT

Figure 1:
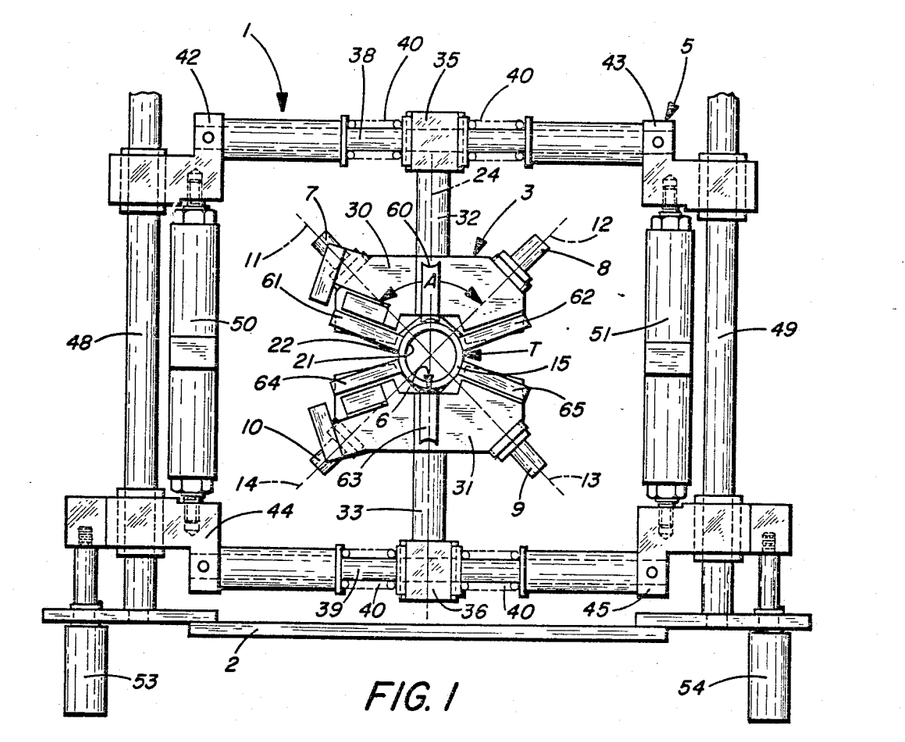
FIG. 1 is a front elevation view of the sensor positioning assembly of one embodiment of the system of the present invention.

Referring again to the drawings, one embodiment of the system of the present invention is shown, generally at 1, in FIG. 1, and includes a sensor positioning assembly 3 which is mounted on a framework 5 for supporting a plurality of thickness sensors 7 to 10 which are arranged for sensing along axes 11 to 14 disposed in predetermined angular relation with respect to one another, such as indicated by the angle A. More particularly, the sensors 7 to 10 are mounted such that their sensing axes 11 to 14 are disposed in uniformly spaced relation about the periphery of a tube T for continuously measuring the thickness of the confronting portion of the tube wall 15. The positioning assembly 3 includes tube guide means 6 which contacts and is supported by the tube T as the tube T is moved in its lengthwise direction, whereby on-line measurement of the thickness of the tube wall 15 can be achieved along each of the respective axes 11 to 14. The guide means 6 maintains the sensors in non-contacting sensing relation with respect to the tube.

Ultrasonic thickness gages (as defined hereinafter) and a signal processing assembly 17 (FIG. 6) are operably connected to the sensors 7 to 10 to receive the sensor information, determine thickness, and to directly compute both the magnitude and direction of the eccentricity E of the tube T, which is indicated by the vector 23 in FIG. 3.

In the form shown in FIG. 1, the sensor positioning assembly 3 includes upper and lower sensor mounting heads 30 and 31 which are supported in spaced relation from one another by rods 32 and 33, respectively. The rods 32 and 33 are in turn connected to bushings 35 and 36 which are slidably mounted on horizontal support rods 38 and 39. The bushings 35 and 36 are each center biased between sets of springs 40 which allow the sleeves 35 and 36 to slide longitudinally back and forth along the rods 38 and 39, and thus allow the sensor mounting heads 30 and 31 to move back and forth in a horizontal direction as the tube T pass line shifts.

As further shown in FIG. 1, the horizontal support rods 38 and 39 are supported at their opposite ends by brackets 42, 43 and 44, 45 respectively. The brackets 42 and 44 are slidably mounted on a vertical guide rod 48, and the brackets 43 and 45 are slidably mounted on a vertical guide rod 49, to enable the sensor mounting heads 30 and 31 to move toward and away from one another for clamping and releasing the tube T, and to enable the heads 30 and 31 to move vertically as the tube passline shifts. Air cylinders 50 and 51 are connected between bracket pairs 42, 44 and 43, 45 which are employed for separating the upper head 30 and lower head 31 from each other and from engagement with the tube T. A pair of air cylinders 53 and 54 may be connected to the brackets 44 and 45 for adjusting the vertical position of the sensor mounting heads to allow the positioning assembly 3 to assume any vertical position assumed by the tube T and to remain in that position until another position is assumed by the tube T. It is understood that, although one guide bar is shown at each horizontal and vertical location, it may be desirable to use two such bars at each location and have the bushings 35 and 36 slidably engaging guide bar pairs in lieu of the construction shown.

The tube guide means 6 comprises two sets of rollers mounted on the sensor mounting heads 30 and 31 for rollingly engaging the tube T and supporting the tube wall 15 in spaced relation from the sensors 7 to 10 to reduce the possibility of damage to either the tube T or the sensors. As shown in FIG. 1, the upper head 30 includes a center roller 60 which is mounted on the head 30 for rotation in a generally vertical plane, and a pair of side rollers 61 and 62 which are mounted on opposite sides of the center roller 60 having their plane of rotation disposed in angular relation with respect to the plane of rotation of the roller 60 and serve to maintain the tube T centered with respect to the center roller 60 and properly aligned with respect to the sensing axes 11 and 12 of the sensors 7 and 8, respectively. Likewise, the lower head 31 includes rollers 63, 64 and 65 which are arranged to engage the opposite side of the tube T from the rollers 60, 61 and 62 for clamping the tube T therebetween upon actuation of the air cylinders 50 and 51 to properly align the sensors 9 and 10 with respect to the tube.

Figure 2:
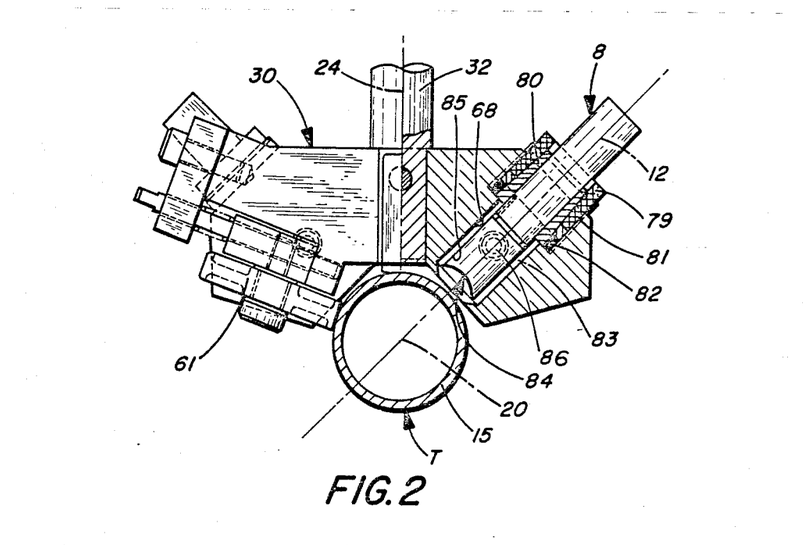
FIG. 2 is an enlarged fragmentary, partially-in-section front elevation view showing one of the sensing heads of the embodiment of the present invention shown in FIG. 1.

All of the sensors 7 to 10 are substantially similar, and one of the sensors, such as 8, is shown in detail in FIG. 2. In a preferred form, the sensor 8 is of the sonic energy transducer type which produces ultrasonic energy and receives ultrasonic echos to allow gaging or measuring of the thickness of the tube wall 15 by determining the time between two successive ultrasonic echos which have travelled through the tube wall 15 and are reflected back to the sensor 8. One type of sensor 8 which may be employed in carrying out the present invention is a Panametric Model No. M3001.

Referring again to FIG. 2, the sensor mounting head 30 includes a bore 68 which is counterbored at its outer end, such as at 81, to form a shoulder 82. The sensor 8 is mounted within a sleeve assembly 80 which is threaded within the counterbore 81. The sleeve assembly 80 is threadably inserted into the counterbore 81 until it abuts the shoulder 82. The outward end of the sleeve assembly 80 is tapered on the exterior and slotted much like a collet. A sleeve 79 with an inner taper is threaded into the counterbore 81 until meeting and compressing the taper of sleeve 80 in the fashion of a collet around the sensor 8 to securely hold the sensor 8. An acoustical lens 84 is mounted at the forward end of the sensor 8 for the purpose of focusing ultrasonic energy and is spaced inwardly from the inner end of the bore 68.

The sensor mounting head 30 is drilled to provide a hole 86 therein for delivering a fluid coupling medium, such as water or the like, into an annular space 83 between the bore 68 and an outside sleeve 85 or sensor 8. More particularly, the fluid coupling medium passes laterally into the space 83, and then travels through the space 83 toward the tube T for spilling out and around the tube T to form a coupling path for the ultrasonic energy. The wheels, such as 61, of the guide means 6 are sized to support the tube wall 15 within a preselected distance from the sensors 7 to 10 to maintain the tube T in coupled relation therewith.

Thickness gages 75 to 78 (FIG. 6) are connected to the sensors 7 to 10, respectively, for producing output signals related to the thickness measurements. One type of gage which may be used in carrying out the present invention is a modified Panametric Model No. 5220 which is modified to circumvent the effect of accoustical delay introduced by the coupling medium or the "ringing" of the ultrasonic energy which occurs when it strikes the surface of the tube 15, (FIG. 2). In addition, electronic gains are adjusted to optimize performance of the gage transducer combination for this application. More particularly, these gages are further designed to insure accurate determination of echo interval. Additionally, since echo interval varies with acoustical velocity as well as thickness of the material, a four-decade precision velocity compensation thumbwheel switch is provided. Still further, the Model No. 5220 gage has circuitry (not shown) to detect loss of signal and for holding the last reading until the signal returns.

Figures 3, 4, 5, 7:
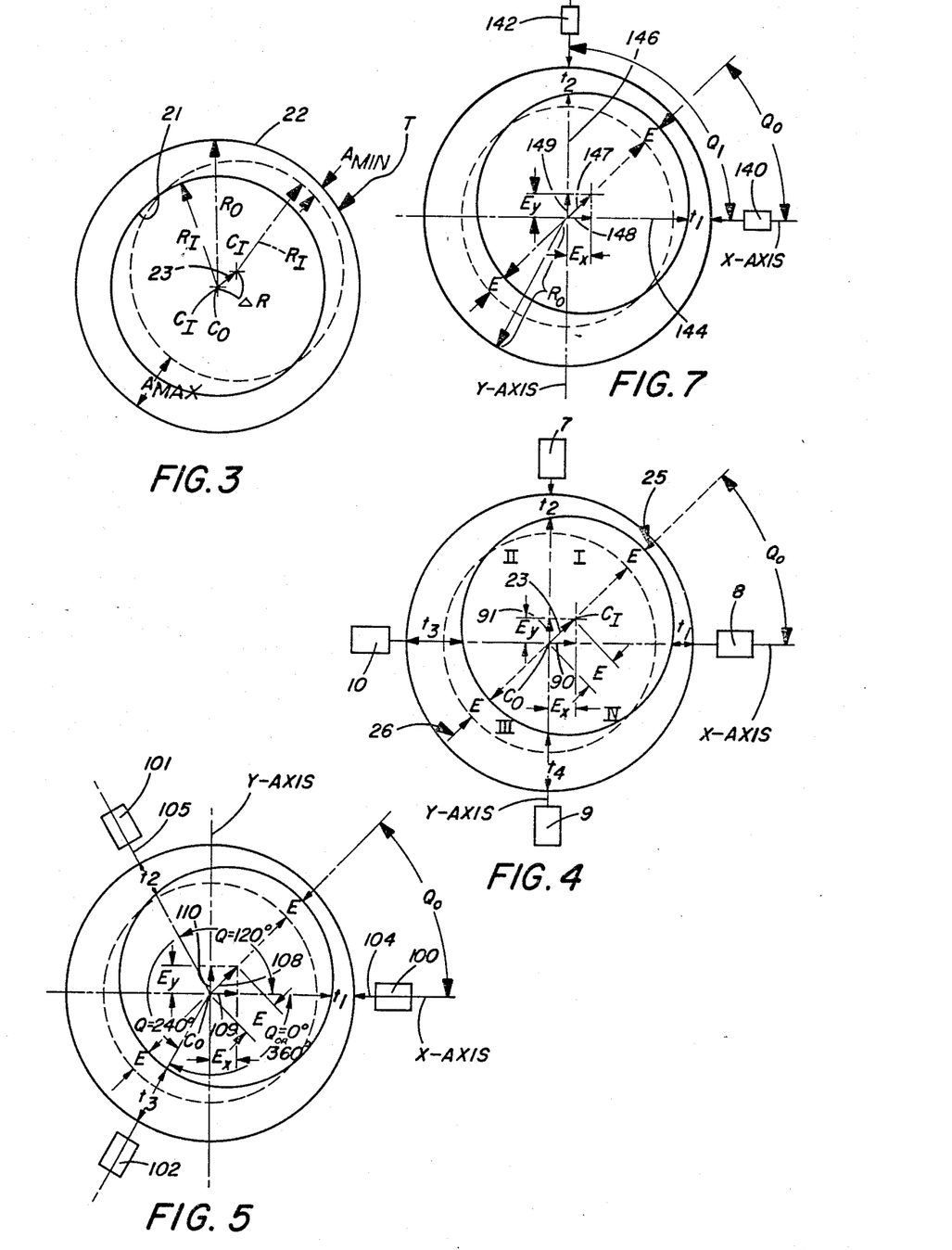
FIG. 3 is a diagrammatic illustration showing eccentricity in a cylindrical tubing product.
FIG. 4 is a diagrammatic illustration of one embodiment of the system of the present invention.
FIG. 5 is a diagrammatic illustration of another embodiment of the system of the present invention.
FIG. 7 is a diagrammatic illustration of still another embodiment of the system of the present invention.

Referring to FIG. 3 for purposes of explanation, $R_I$ represents the radius of the inner surface 21 of the tube T, and $R_o$ represents the radius of the outer surface 22 of the tube T. Assuming that the inner 21 and outer 22 surfaces define perfect concentric circles where no oviality is present, the geometrical center $C_I$ of the inner surface 21 will be coincidental with the center $C_o$ of the outer surface 22, and thus, no eccentricity E will exist. On the other hand, when eccentricity E is present, the center $C_I$ of the inner surface 21 will shift with respect to the center $C_o$ of the outer surface 22, such as indicated by the vector 23. Thus, the eccentricity E of the tube T may be defined as either (1) the straight line distance E between the center $C_1$ of the inner surface 21 of the tube wall 15 and the center $C_o$ of the outer surface 22 of the tube wall 15, or (2) one-half the difference between the value of the maximum thickness $A_{max}$ and minimum thickness $A_{min}$ of the tube wall 15. In addition, in FIG. 1, the sensing axes 11 to 14 are shown mechanically offset, such as at an angle of 45°, with respect to the vertical and horizontal position. For purposes of explanation, the sensors 7 to 10 have been shown in FIG. 4 to be rotated 45° in a clockwise direction from their position in FIG. 1, such that their sensing axis 11 to 14 are shown to extend in generally horizontal and vertical directions.

As previously indicated, and referring to FIG. 4, the eccentricity E of the tube T is designated by the vector 23. Mathematically, a vector has both direction and magnitude. In the present invention, the magnitude is, of course, the distance E between the centers $C_o$ and $C_1$, whereas the direction must be calculated with respect to some established reference axis. In the form of the invention employing the four sensors 7 to 10, as shown in FIG. 4, the sensing axis 12 of the sensor 8 has been selected at the reference axis. Thus, the angle between the vector 23 and the axis 12 is defined as the eccentricity angle $Q_o$. The sensing axis 14 of the sensor 10 and the sensing axis 12 of the sensor 8 are coincidental with one another and together define an x-coordinate axis for determining one vector component $E_x$ indicated by the arrow 90 of the vector 23. Likewise, the sensing axis 13 of the sensor 9 is substantially coincidental with the sensing axis 11 of the sensor 7 and together therewith define a y-coordinate axis for determining another vector component $E_y$, indicated by the arm 91, of the vector 23. The x and y axes extend perpendicular to one another and diametrically of the tube T to divide the tube T into four quadrants, I, II, III and IV. The quadrant I covers eccentricity angles of 0° to 90° between the sensors 8 and 7. The quadrant II covers eccentricity angles from 90° to 180° between the sensors 7 and 10. Quadrant III covers angles from 180° to 270° between the sensors 10 and 9, and quadrant IV covers angles from 270° to 360° between the sensors 9 and 8. Thus, using the sensing axis 12 of the sensor 8 as the reference axis, when the center $C_1$ of the inner surface 21 is located in Quadrant I, the eccentricity angle $Q_o$ would be between 0° and plus 90°. On the other hand, should the $C_1$ of the inner surface be in quadrant III, the eccentricity angle Q would be between 180° and 270°.

For applications involving round tubular products whose eccentricity and wall thickness are substantially less than the outer diameter of the tube, it can be shown that the wall thickness around the circumference of the tube varies as $t = A_o - E \cos(Q - Q_o)$ where $A_o$ is the average wall thickness, E is the eccentricity, $Q_o$ is the eccentricity angle and Q is the angular location at which the wall thickness is to be measured. It is to be noted that a more exact equation can be used if eccentricity and/or wall thickness is not substantially less than the outer diameter of the tube.

Wherein a plurality of thickness sensors are used, the $j^{th}$ thickness sensor would measure a wall thickness having a value of $t_j = A_o - E \cos(Q_j - Q_o)$. A general set of equations can then be written for a plurality of $j$ sensors:

$$t_1 = A_o - E \cos(Q_1 - Q_o)$$
$$t_2 = A_o - E \cos(Q_2 - Q_o)$$
$$t_j = A_o - E \cos(Q_j - Q_o)$$

Making use of trigonometric identities, these equations can be rewritten as:

$$t_1 = A_o - E(\cos Q_1 \cos Q_o + \sin Q_1 \sin Q_o)$$
$$t_2 = A_o - E(\cos Q_2 \cos Q_o + \sin Q_2 \sin Q_o)$$
$$t_j = A_o - E(\cos Q_j \cos Q_o + \sin Q_j \sin Q_o)$$

Recognizing that the x and y axis components of eccentricity are respectively $E_x = E \cos Q_o$ and $E_y = E \sin Q_o$ the thickness equations can be rewritten as:

$$t_1 = A_o - E_x \cos Q_1 - E_y \sin Q_1$$
$$t_2 = A_o - E_x \cos Q_2 - E_y \sin Q_2$$
$$t_j = A_o - E_x \cos Q_j - E_y \sin Q_j$$

If, specifically, four sensors are disposed at, in particular, 0°, 90°, 180° and 270°, then these equations further reduce to:

$$t_1 = A_o - E_y$$
$$t_2 = A_o - E_x$$
$$t_3 = A_o + E_y$$
$$t_4 = A_o + E_x$$

There thus a multiplicity of equations involving the unknown quantities $A_o$, $E_x$ and $E_y$. Three unknowns require three equations which in turn require only three thickness measurements. Should one of the unknown, such as for example $A_o$, be determined through other means, the number of equations required to allow determination of the remaining unknowns is reduced to two. $A_o$ may for example be determined from extrusion die geometry and/or other manufacturing process information. There are, however, practical advantages in using four sensors as opposed to three or two. One advantage, for example, is the generation of an on-line ovality/miscalibration signal.

It is to be understood that the unknowns in the preceding equations need not be restricted to $A_o$, $E_x$ and $E_y$. Additionally, it is to be understood that the use of a single sensor which is made to rotate around the tube circumference can have its thickness information sampled at appropriate times and/or angular locations and thereby produce thickness information equivalent to a plurality of non-rotating sensors. It should, however, be readily apparent to those skilled in the art that the use of a rotating sensor (or sensors) involves a number of practical disadvantages which are not present or can be circumvented with the use of a non-rotating sensor assembly.

Figure 6:
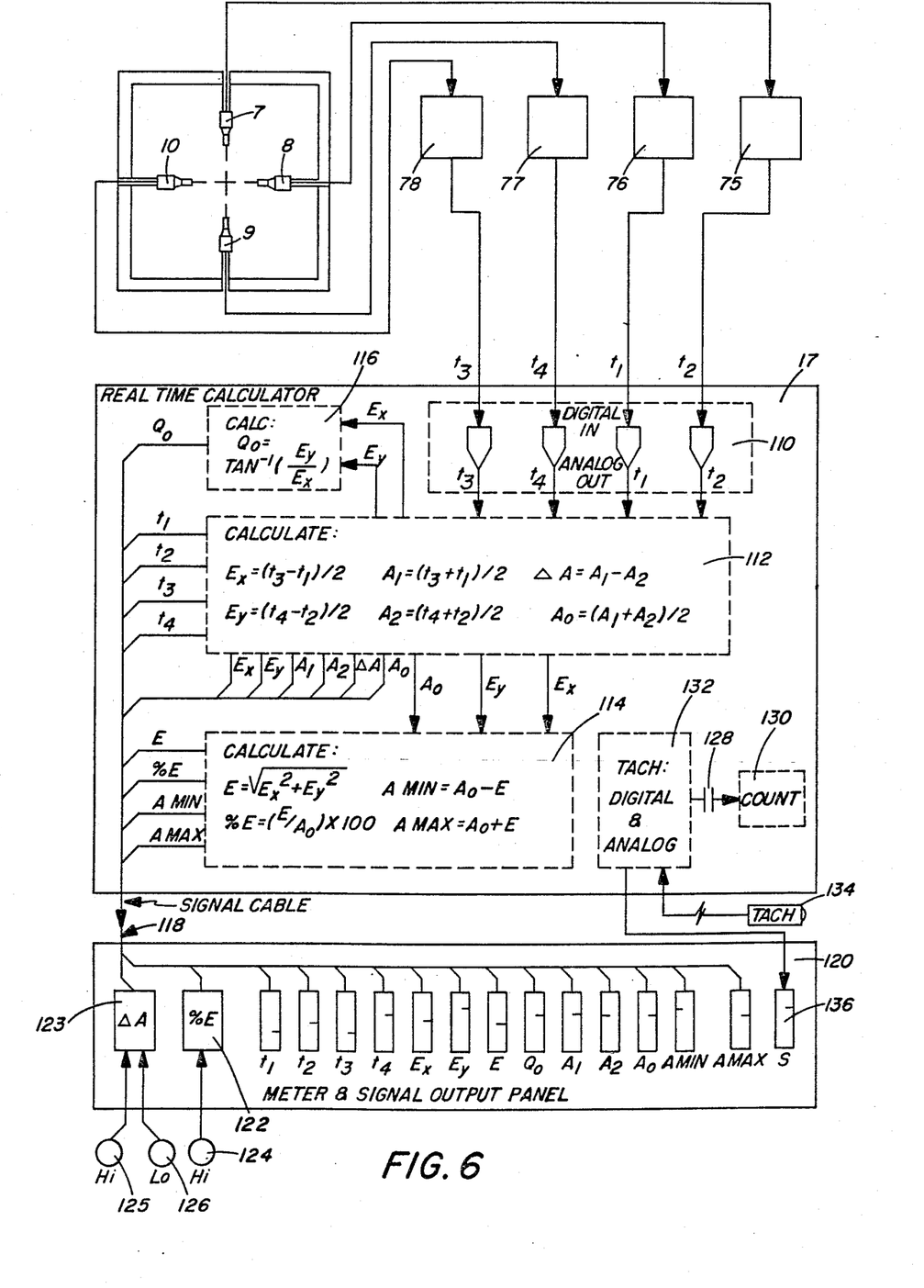
FIG. 6 is a schematic illustration of the embodiment of the present invention shown in FIG. 4.

The signal processing assembly 17 (FIG. 6) is connected to the gages 75-78 for receiving the output signals related to the thickness measurement of the tube wall 15 along the axes 11-14. The signal processing unit 17 may be provided with components, as well known in the art, to perform certain mathematical calculations to determine, in one instance, the magnitude of the eccentricity vector 23 by summing its x-axis and y-axis components $E_x$ and $E_y$, indicated by the arrows 90 and 91 respectively, according to the equation:

$$E = \sqrt{E_x^2 + E_y^2}$$

where $(t_3 - t_1)/2$ equals the $E_x$ component being one-half the difference in the tube wall thicknesses on opposite sides of the tube as sensed by the sensors 8 and 10, and where $(t_4 - t_2)/2$ equals the $E_y$ component being one-half the difference in the wall thicknesses on opposite sides of the tube T as sensed by the sensors 7 and 9 as seen best in FIG. 4. Thus, the value of eccentricity E can be determined directly from these thickness measurements without reference to any additional physical data other than ultrasonic signal velocity of the tube T. This equation, as well as those which follow, is based on the assumption that negligible ovality is present and that the eccentricity E is less than approximately 10% of the radius of the tube T.

Two average wall thicknesses $A_1$ and $A_2$ can be determined from the four thickness measurements according to the equations:

$$A_1 = t_1 + t_3/2$$

or $$t_2 + t_4/2 = A_2$$

Additionally, an over-all average wall thickness $A_o$ may be calculated according to the equation:

$$A_o = (t_1 = t_2 = t_3 = t_4)/4 = (A_1 + A_2)/2$$

An on-line check for ovality and/or miscalibration of the sensors 7 to 10 can be monitored according to the equation $(t_1 + t_3) - (t_2 + t_4) = 0$. Further, the maximum and minimum wall thickness $A_{maximum}$ and $A_{minimum}$ respectively can be calculated from the equations:

$$A_{maximum} = A_o + E$$
$$A_{minimum} = A_o - E$$

and the percent eccentricity can be calculated from the equation:

$$\% \, E = (E/A_o) \times 100$$

The assembly 17 may also be designed to calculate the eccentricity angle $Q_o$. More particularly, as the values of $E_y$ and $E_x$ are available, commercially available devices such as analog arc-tangent modules may be provided to continuously compute the angle $Q_o$ according to the equation:

$$\tan Q_o = E_y/E_x = E \sin Q_o/E \cos Q_o = (t_4 - t_2)/(t_3 - t_1)$$

As the shift in origin can be determined according to sign and magnitude, the angle Q can be determined for the entire periphery of the tube, or 360° and an output signal related to the angle $Q_o$ can be produced for actuating a monitoring device, such as a metering device or the like. Thus, a continuous readout or recording of eccentricity and the angular location of eccentricity E and the angular location $Q_o$ of the eccentricity can be made, which information would be indicative of misalignment of the extrusion press, die wear, mandrel displacement or other parameters related to the extrusion process.

In FIG. 6 there is shown a digital to analog converter (DAC( chassis 110 as part of the signal processing assembly 17. The DAC chassis converts the digital thickness information supplied by the ultrasonic thickness gages 75-78 into analog thickness information for further processing by an analog computational unit 112. Analog computational unit 112 calculates several eccentricity related parameters and forwards these parameters to additional computational modules 114 and 116 as required. Additionally, the parameters calculated by module 112, via techniques well known in the art, are forwarded, via a data cable 118, to a meter and signal output panel 120. The eccentricity related parameters calculated by computational module 112 are also forwarded to the meter readout panel 120 by signal cable 118. Computational module 116 determines the eccentricity angle $Q_o$ and this parameter is also forwarded by signal cable 118 to the meter panel 120. An additional signal cable (not shown) can be used to forward a number of eccentricity related parameters to a remote signal display panel (not shown).

Meter panel 120 contains metering modules 122 and 123 of a type familiar to those skilled in the art which simultaneously display their respective signal input levels and compares their respective input levels against pre-set references as determined by potentiometer 124 for meter module 122 and by potentiometers 125 and 126 for meter module 123. Meter module 123 is preferably used to generate an alarm to indicate possible malfunction of some system component. Similarly, it is desirable that meter module 122 cause an alarm to be generated when the parameter percent eccentricity (previously defined and designated as % E) exceeds a predetermined maximum allowable limit as set by potentiometer 124. Additionally, when percent eccentricity exceeds the maximum allowable limit, a relay current 128 closes and gates a known number of pulse per foot of product produced in an out-of-tolerance condition into a footage counter 130. Footage pulses are provided by a tachometer unit 132 and tachometer pickup head 134. The tachometer unit 132 also produces an analog voltage indicative of product line speed which is forwarded to meter 136 on meter panel 120 for display. Meter panel 120 can also contain output signal test points (not shown) for recording, additional display, metering or implementation of process control functions as desired.

Another embodiment of the present invention is shown in FIG. 5. Based on the assumption that the wall thickness varies at $t = A_o - E \cos(Q - Q_o)$ where $t$ = wall thickness measured at an angle Q with respect to a reference axis; $E$ = the maximum change in wall thickness over the average wall thickness; $A_o$ = average wall thickness and $Q_o$ is the eccentricity angle as measured with respect to the reference axis, then the signal processing assembly 17 may be pre-programmed to determine the magnitude of the eccentricity E from the equation:

$$E = \sqrt{E_x^2 + E_y^2}$$

where $$E_x = (a_2 t_1 + a_4 t_2 + a_6 t_3)/a_o$$
$$E_y = (a_1 t_1 + a_3 t_2 + a_5 t_3)/a_o$$

and $a_o = b_1 + b_2 + b_3$ with $b_1 = \text{SIN}(Q_3 - Q_2)$, $b_2 = \text{Sin}(Q_1 - Q_3)$, $b_3 = \text{Sin}(Q_2 - Q_1)$ and $a_1 = \cos Q_2 - \cos Q_3 a_2 = \text{Sin } Q_3 a_5 = \cos Q_1 - \cos Q_2 a_6 = \sin Q_2 - \sin Q_1$.

The average wall thickness $A_o$ can be calculated from the equation:

$$A_o = (b_1 t_1 + b_2 t_2 + b_3 t_3)/a_o$$

Additionally, the eccentricity angle $Q_o$ can be obtained with the use of the equation:

$$\text{Tan } Q_o = E_y/E_x = (a_1 t_1 + a_3 t_2 + a_5 t_3)/(a_2 t_1 + a_4 t_2 + a_6 t_3).$$

In this form three sensors 100, 101 and 102 are provided which are shown positioned at equally spaced intervals about the periphery of the tube T having the sensing axes 104, 105 and 106 extending at an angle of 120° with respect to one another. In this arrangement, the sensing axis 104 of the sensors 100 has been selected as the references axis and further defines the x-coordinate axis for determining the mangitude and angular location of the eccentricity vector 108. The x-coordinate axis component $E_x$ of the vector 108 is represented by the vector 109 and the y-coordinate axis component is represented by the vector 110. Thus, the value of $E_x$ will be the um of the x-axis components of thickness measurements taken along the sensing axes 104, 105 and 106, and the value of $E_y$ will be the sum of all of the y-axis components of the thickness measurements taken along the axis 104, 105 and 106.

As shown in FIG. 5, the angles $Q_1$, $Q_2$, and $Q_3$ are (conveniently) chosen as 0°, 120°, 240°, respectively. For this special case: $E_x E_y$, $A_o$, TAN $Q_o$ and E are given by the equations $E_x = (t_1 + t_3 - t_1)/3$; $E_y = (t_3 - t_2)/\sqrt{3}$; $A_o = (t_1 + t_2 + t_3)/3$;

$$TAN\ Q_o = \frac{\sqrt{3}\ (t_3 - t_2)}{t_2 + t_3 - 2t_1}\ ;\ and$$

$$E = \sqrt{E_x^2 + E_y^2}\ .$$

Thus, the values of E, $A_o$, and $Q_o$ can be determined for the purpose of continuous on-line monitoring of the extrusion process in the same manner as the embodiment of the invention in FIG. 4.

In this embodiment, as in the previously described embodiments, it is possible to control the process on the basis of a nominal or average wall thickness independently of the magnitude of eccentricity, because the average wall thickness $A_o$ is calculated. Accordingly, if the process is controlled in this manner, such would require the inclusion of a system for adjusting or varying the wall thickness in response to the continuous determination of the average wall thickness $A_o$.

Still another embodiment of the present invention is shown in FIG. 7. In this form of the invention, two stationary sensors 140 and 142 are provided which are supported in position about the periphery of the tube T having their sensing axes 144 and 146 extending at an angle of $Q_1$ with respect to one another. In FIG. 7 the eccentricity E of the tube T is represented by the vector 147 which has an x-axis component $E_x$, represented by the vector 148, and a y-axis compoent $E_y$, represented by the vector 149. Theoretically, the eccentricity E of the tube T can be found with two thickness sensors, such as 140 and 142, as long as they are not positioned in diametrically opposed relation with respect to one another, that is, have their sensing axes, such as 144 and 146, extending in axially aligned relation to one another so as to be substantially coincidental. Moreover, it is not practical to position the sensing axes 144 and 146 at angular positions approximating 180° with respect to one another because this would require an extremely high degree of measurement accuracy to provide meaningful data for calculating purposes. Therefore, a practical selection is to position sensing axes 144 and 146 of the thickness sensors 140 and 142 at an angle $Q_1$ of approximately 90° with respect to one another, with the sensing axis of one sensor, such as 140, defining the reference or zero degree axis.

Based on the aforementioned assumption that the wall thickness varies as $t = A_0 - E\cos(Q - Q_o)$ and 90° spacing between transducers then a signal processing assembly, such as 17 in FIG. 6, may be programmed to determine the magnitude of the eccentricity E and the eccentricity angle $Q_o$ from the equation:

$$E = \sqrt{E_x^2 + E_y^2} \qquad Q_o = \tan^{-1}(E_y/E_x)$$

where $E_x = A_o - t_1$ and $E_y = t_2 - A_o$. There are two equations with three unknowns: $E_x$, $E_Y$ and $A_o$. If, $A_o$, the average wall thickness, is known through other means, $E_x$ and $E_Y$ can be determined, and hence E and $Q_o$ may also be determined. If, on the other hand, $Q_o$ is known, then $A_o$ and E may be determined, and hence also $E_y$ and $E_Y$.

As can be seen, determination of eccentricity with the use of two stationary transducers requires prior knowledge or product parameters other than the acoustical velocity, such as average wal thickness or inner and outer radius or eccentricity angle.

It should be readily apparent to those skilled in the art that the embodiment of this invention is not of a restrictive nature. To illustrate the non-restrictive nature, the following examples are provided:

Rectangular tubing — with reference to FIG. 4, the round tubing may be replaced by rectangular tubing having the wall surfaces perpendicular to the sensor axis. The centers of the inner and outer walls would be defined by the point of intersection of the wall diagonals. Eccentricity, eccentricity angle and average wall thickness are then given by the same equations as those for the case of round tube; that is:

$$E_x = (t_3 - t_1)/2$$
$$E_Y = (t_4 - t_2)/2$$
$$A_o = (t_1 + t_2 + t_3 + t_4)/4$$
$$E = \sqrt{E_x^2 + E_y^2}$$
$$Q_o = TAN^{-1}(E_Y/E_x)$$

Use of Wall Thickness Ratios — if conditions are such that $t' = g_o t$ where $t'$ and $t$ are the measured and actual value of wall thickness respectively and $g_o$ is an unknown factor which incorporates the effects of temperature and/or density and/or other factors which can cause measurement error, then the ratio of two measurements can be used to eliminate the factor $g_o$. With reference to FIG. 4, let $t_1'$, $t_2'$, $t_3'$, $t_4'$ denote the thickness as measured by the four sensors 7, 8, 9, 10 respectively. Let $M_{13}$ and $M_{24}$ be the ratio of $t_1'$ to $t_3'$ and $t_2'$ to $t_4'$ respectively. The following equations may be written:

$$M_{13} = \frac{t_1'}{t_3'} = \frac{g_o t_1}{g_o t_3} = \frac{t_1}{t_3} = \frac{A_o - E\cos(Q_1 - Q_o)}{A_o - E\cos(Q_3 - Q_o)}$$

$$M_{24} = \frac{t_2'}{t_4'} = \frac{g_o t_2}{g_o t_4} = \frac{t_2}{t_4} = \frac{A_o - E\cos(Q_2 - Q_o)}{A_o - E\cos(Q_4 - Q_o)}$$

where $A_o$, E and $Q_o$ are the average thickness, eccentricity and eccentricity angle respectively. since $Q_1 = 0°$, $Q_2 = 90°$, $Q_3 = 180°$ and $Q_4 = 270°$, these equations simplify to:

$$M_{13} = \frac{A_o - E_x}{A_o + E_x}$$

$$M_{24} = \frac{A_o - E_y}{A_o + E_y}$$

The following expressions can be obtained from these two equations:

$$\text{Percent Eccentricity} = \frac{E}{A_o} \times 100 = 100 \times \sqrt{\left(\frac{1-M_{13}}{1+M_{13}}\right)^2 + \left(\frac{1-M_{24}}{1+M_{24}}\right)^2}$$

$$\frac{E_y}{E_x} = \frac{(1-M_{24})(1+M_{13})}{(1+M_{24})(1-M_{13})} \text{ with } Q_o = \text{TAN}^{-1}\left(\frac{E_y}{E_x}\right)$$

It is to be understood that the embodiment of this invention is not restricted to wall thickness variations which are described by the equation $t = A_o - E \cos(Q - Q_o)$. Additionally, it is to be understood that the basic principles set forth are quite adaptable to other products such as triangular tubing or insulated conductor and to other uses such as determining the location of the center of an inner wall relative to a point which is not coincident with the center of the outer wall. Further, the invention is not limited to on-line uses.

We claim:

1. A system for determining eccentricity characteristics of a tube comprising,
    a frame,
    sensing means mounted on said frame for sensing the thickness of a wall of a tube, said sensing means including at least three thickness sensors supported in sensing position with respect to said tube at predetermined angularly spaced locations with respect to each other and with the axes of the sensors intersecting at substantially the same point for producing output signals which are related to the thickness of the tube wall at the locations sensed and,
    signal processing means for receiving the output signals from said sensors and translating these output signals into vector components of the eccentricity of the tube, and for summing said vector components to provide an eccentricity signal related to the magnitude and angular location of the tube eccentricity.

2. A system in accordance with claim 1, wherein the sensing means comprises ultrasonic sensors for sensing the thickness of the wall of the tube.

3. The system of claim 1, wherein
    the sensing means includes at least one mounting head adapted to support the sensors in predetermined angular relationship to each other and in radially spaced relationship to the tube.

4. A system in accordance with claim 1, wherein said sensing means includes a plurality of sensor mounting heads for supporting said sensors, and
    said mounting heads are designed for movement toward and away from one another to move said sensors between the sensing position and a non-sensing position with respect to said tube.

5. A system in accordance with claim 1, wherein said sensing means includes guide means for maintaining a predetermined spaced relation between said sensors and said tube as said tube moes in a direction of its lengthwise axis.

6. A system in accordance with claim 1, wherein said sensing means comprises three sensors for sensing the thickness of the tube wall at 120° intervals thereabout.

7. A system in accordance with claim 1, wherein said sensing means comprises four sensors for sensing the thickness of the tube wall.

8. A system in accordance with claim 7, wherein
    said sensing means comprises four sensors for sensing the thickness of the tube wall at 90° intervals thereabout.

9. A system in accordance with claim 1, wherein
    said signal processing means includes comparator means for establishing a reference signal related to the maximum allowable eccentricity, and
    indicating means for receiving said reference signal and said eccentricity signal and producing an output signal when said eccentricity signal exceeds said reference signal for operating a visual and/or audio indicator.

10. A method for determining eccentricity characteristics of a tube along the lengthwise axis of the tube, comprising
    moving a tube relatively to a thickness sensing assembly, including at least three thickness sensors, in the direction of the lengthwise axis of the tube,
    sensing the thickness between the outer and inner wall of the tube by said sensors at not less than three locations having predetermined angular spacing around the tube along axes intersecting at substantially the axial center of one wall of the tube, and
    determining the eccentricity of the longitudinal central axis of the other wall relative to the longitudinal central axis of said first mentioned wall, in magnitude and direction, by transforming the values of said sensed thicknesses into eccentricity vector components and utilizing the vector components to determine the magnitude and angular location of the tube eccentricity.

11. A method in accordance with claim 10, wherein the average wall thickness is combined with said vector components in determining the angular location of the tube eccentricity.

12. A method for determining eccentricity characteristics of a tube along the lengthwise axis of the tube comprisingthe steps of,
    moving a tube relative to a thicknes sensing assembly, including at least three thickness sensors, in the direction of the lengthwise axis of the tube,
    sensing the thickness of the wall of the tube by said sensors at not less than three locations having predetermined angular spacing around the tube, and along axes which extend substantially radially of said tube,
    determining the magnitude of the eccentricity of said tube by summing eccentricity vector components calculated from the thickness values sensed at said locations,
    determining the average tube wall thickness on the basis of the thickness values sensed, and
    determining the percent of eccentricity by the ratio of the magnitude of the eccentricity to the average tube wall thickness.

13. A method for determining eccentricity characteristics of a tube along the lengthwise axis of the tube comprising the steps of,
    moving a tube relatively to a thickness sensing assembly, including at least three thickness sensors, in the direction of the lengthwise axis of the tube,
    sensing the thickness of the wall of the tube by said sensors at not less than three locations having predetermind angular spacing around the tube, and along coordinate axes which extend substantially radially of said tube, determining the magnitude of the eccentricity of said tube by summing eccentricity vector components calculated from the thickness values sensed at said locations, and determining the angular location of eccentricity of said tube wall by determining the ratio or ratios of magnitude of said vector components along said coordinate axes.

14. A method-for determining the eccentricity characteristics of a tubing product, the steps comprising, providing a sensor assembly including at least three thickness sensors, moving said tubing product in a lengthwise direction with respect to said sensors, positioning said sensors so as that each sensor senses along a path defining an axis which extends radially of the tubing product with the axes of the sensors intersecting at substantially the center of said tubing product, sensing the thickness of the wall of the tubing product by said sensors at not less than three locations for producing output signals which are related to the thickness of the tubing wall at the locations sensed, receiving the thickness related signals from said sensors and translating these thickness signals into vector components of the eccentricity of the tubing product, and summing said vector components to provide the eccentricity value and its angular location respect to the tubing product.

* * * * *